June 5, 1928.

G. C. CARHART 1,672,368

TRANSMISSION MECHANISM

Filed Nov. 22, 1923

INVENTOR.
George C. Carhart
BY
Parsons & Brdell
ATTORNEYS.

June 5, 1928.  
G. C. CARHART  
TRANSMISSION MECHANISM  
Filed Nov. 22, 1923
1,672,368
3 Sheets-Sheet 2
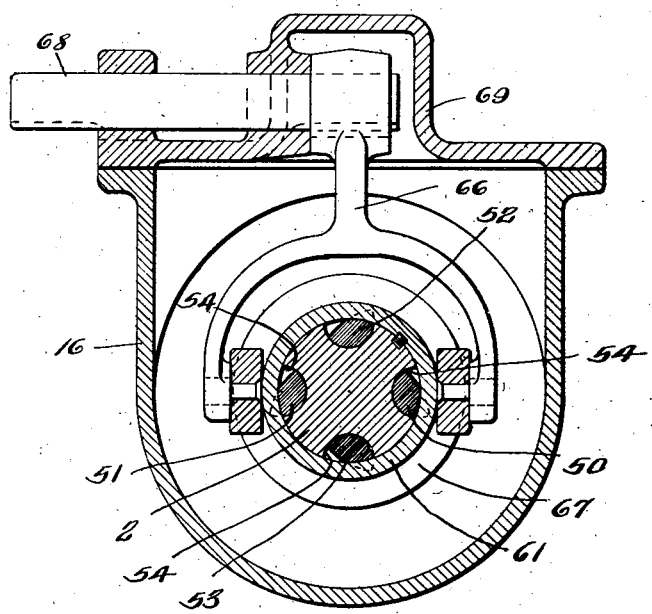
Fig-2-
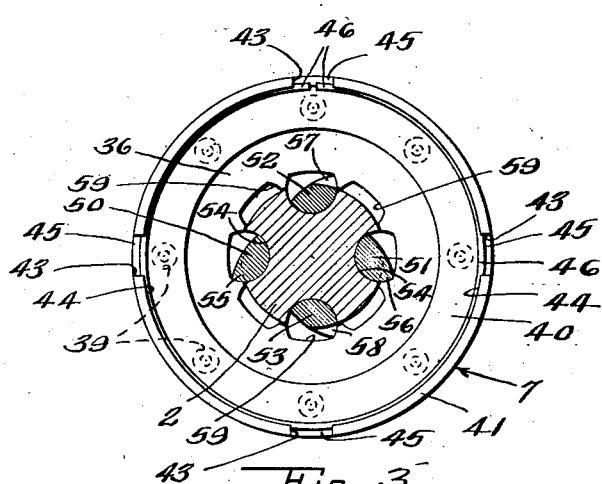
Fig-3-
INVENTOR.  
George C. Carhart  
BY  
Parsons & Bodell  
ATTORNEYS.

June 5, 1928.
G. C. CARHART
1,672,368
TRANSMISSION MECHANISM
Filed Nov. 22, 1923    3 Sheets-Sheet 3
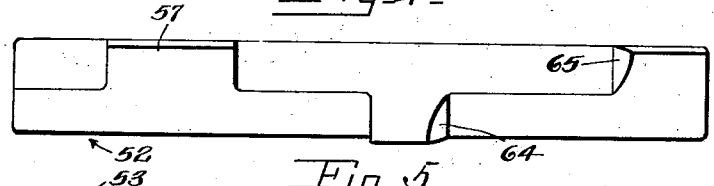
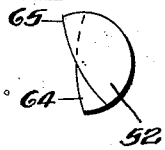
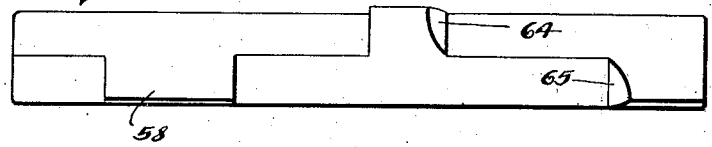
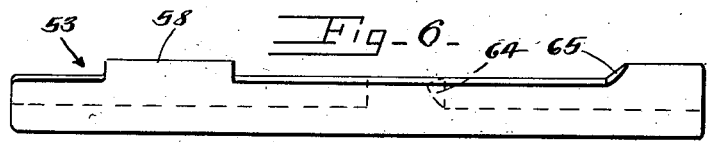
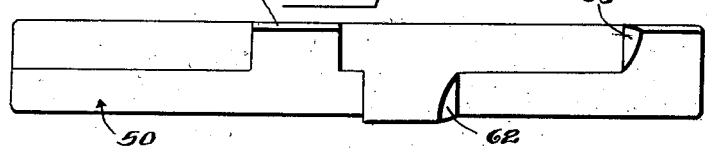
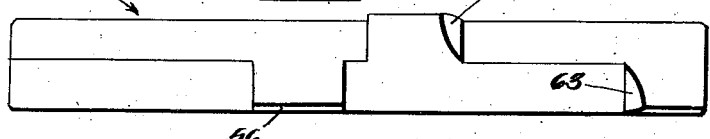
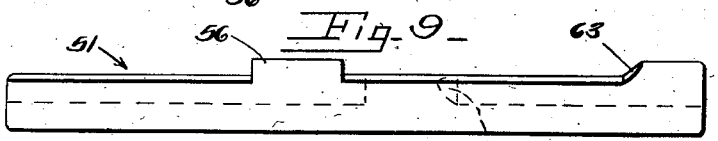
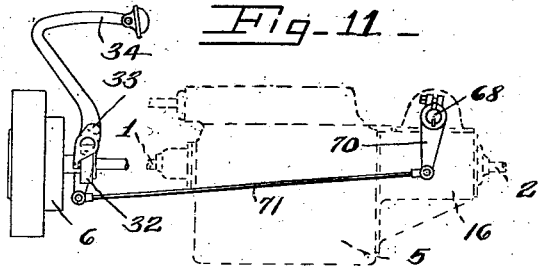
INVENTOR.
George C. Carhart
BY
Parsons & Bodell
ATTORNEYS.

Patented June 5, 1928.

1,672,368

UNITED STATES PATENT OFFICE.

GEORGE C. CARHART, OF SYRACUSE, NEW YORK, ASSIGNOR TO BROWN-LIPE GEAR COMPANY, OF SYRACUSE, NEW YORK, A CORPORATION OF NEW YORK.

TRANSMISSION MECHANISM.

Application filed November 22, 1923. Serial No. 676,441.

This invention relates to transmission mechanism, particularly of the type used in motor vehicles, and has for its object an especially simple compact, durable and efficient secondary clutch, for transmitting the motion to the driven shaft of the variable speed gearing or the driven shaft section connected to the propeller shaft of the vehicle, which clutch is operable in conjunction with the main or engine clutch in such manner that the transmission gearing is disconnected from the propeller shaft during gear shifting operations, the secondary clutch being of such construction that it is engaged and disengaged after and before each gear shifting operation with out shock or jar irrespective of the personal equation of the operator and irrespective of the momentum of the rotating parts of the gearing, or of the propeller shaft due to the momentum of the vehicle.

The invention consists in the novel features and in the combinations and constructions hereinafter set forth and claimed.

In describing this invention reference is had to the accompanying drawings in which like characters designate corresponding parts in all the views.

Figure 2 is a sectional view taken on the plane of line 2—2, Fig. 1.

Figure 3 is a sectional view taken on the plane of line 3—3, Fig. 1.

Figure 4 is a plan view of the key for locking one of the clutch sections to the driven shaft, for transmitting the drive in one direction.

Figure 5 is a view of the other key similar to the view shown in Fig. 4, for transmitting the drive in the other direction.

Figure 6 is an elevation of the key shown in Figure 5.

Figure 1:
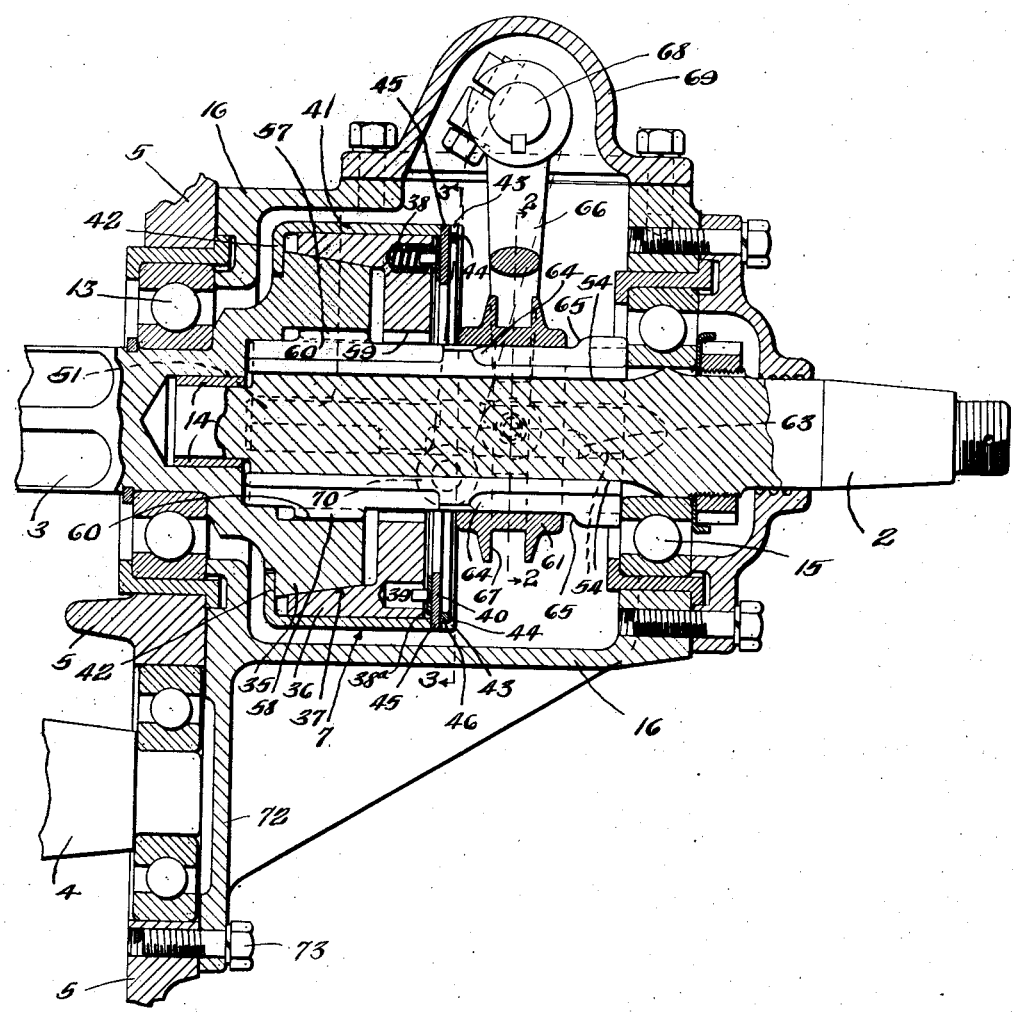
Figure 1 is a fragmentary, vertical sectional view of a transmission mechanism showing the secondary clutch mechanism and the contiguous portion of the transmission gearing.

Figures 7, 8, and 9 are views similar to Figs. 4, 5, and 6, of the right and left keys for transmitting the motion between the driven shaft and the clutch section, which is rotatably mounted on the driving shaft.

Figure 10 is an end elevation of the key shown in Fig. 4, and is an illustrative end elevation of the key shown in Figs. 5, 7 and 8.

Figure 11 is a diagrammatic view of the entire transmission mechanism including the main clutch between the engine, and the transmission gearing, the operating lever for the secondary clutch at the rear of the transmission gear and the connections between the operating means for such clutches.

In transmission gearings, such as are used in motor vehicles, in shifting the gears the main or engine clutch is first thrown off by depressing the clutch pedal and then the gear shifting lever operated, and after the shifting is completed the engine clutch is again engaged by releasing the clutch pedal. If the gears which are to be meshed are not rotating at approximately the same speed the gears will clash instead of meshing and the operator must either wait until the movements of the gears synchronize or in case of shifting from a high to a lower speed, the operator must again let in the clutch and speed up the engine until the speed of the transmission gears are synchronized. Such operation requires skill and in some situations it is impossible for the ordinary operator, and with many drivers gear shifting is a hit or miss affair.

Secondary clutches have been employed to disconnect the transmission gearing from the propeller shaft of the vehicle, during the gear shifting operations in order that the gears can not only be disconnected from the engine but also from the propeller shaft of the vehicle in order that the gears may be practically idle during the gear shifting operations. Jaw clutches used to disconnect the driven shaft of the gearing during the gear shifting operations and to connect the shaft after the gear shifting operation are liable to and usually do engage with a shock, jar or noise, when the main clutch is engaged. Such shock and jar is due to the fact that the momentum of the vehicle is not synchronized with the speed of the engine, so that either the gears are rotating faster than the driven shaft or the driven shaft is being rotated by the momentum of the vehicle faster than the gears of the gearing. When friction clutches, disk clutches, etc., have been used the same shock and jar usually takes place owing to the fact that a nice adjustment of the friction faces cannot be made so that the clutch will not grab or take hold too soon and any adjustment is more or less a hit or miss affair, and furthermore the friction of such friction clutches when fully engaged must be equal to or greater than the friction of the main clutch, it being understood that the main clutches are of some friction type. In other words the frictional engagement of the secondary clutch at the rear end of the transmission must be sufficient to transmit the maximum torques at all times without slipping and must be capable of slipping without grabbing after each gear shifting operation to permit the clutch to engage without jar or shock after each gear shifting operation. It is extremely difficult if not impossible to combine a main clutch and a secondary friction rear clutch which will transmit the maximum and varying torques without slipping and at the same time easily engage to eliminate shock and jar, without grabbing or taking hold too soon, that is, to combine with the main clutch, a secondary clutch that will compensate or equalize for the variations between the momentum of the vehicle and the speed of the engine.

My invention has for its object a construction or combination of such secondary clutch with a main clutch of the vehicle, whereby the secondary clutch will engage easily and without shock and jar regardless of the differences or variations between the momentum of the vehicle and the engine speed and also will transmit without slipping the maximum torques, that it is called upon to transmit in the operation of the vehicle.

This transmission mechanism, comprises generally driving and driven members or shafts, frictionally engaged and preferably constantly frictionally engaged clutch sections, one of which is rotatably secured to one of said members or shafts usually the driving shaft and rotatable relatively to the other member or driven shaft, and the other of which sections is mounted on the latter or driven shaft to rotate about the same, and means operable when operated to successively lock the frictionally engaged sections to the latter member or driven shaft and successively unlock the same in the reverse order. That is the operating means operates first to lock the clutch section rotatably mounted on the driven member or shaft and disconnected from the driving shaft except for the friction between the friction faces of the clutch sections so that the motion is first transmitted from one section to the other through a friction drive, and the operating means thereafter operates to positively lock the section secured to the driving member or shaft to the driven shaft. And in addition the invention includes a connection between the operating means for the main clutch and the operating means for the frictionally engaged clutch sections, or secondary clutch, whereby when the main clutch operating means or clutch pedal is depressed to throw off the main clutch, the clutch section which is permanently secured to the driving member or shaft is first unlocked from the driven shaft so that the drive is through the yielding friction of the frictionally engaged sections and thereafter the other section disengaged or unlocked, from the driven shaft, so that, the gearing is entirely free of the engine, and the propeller shaft of the vehicle and the gears can come to a stop or nearly to a stop preliminary to the gear-shifting operation; and whereby after the gear shifting operation is completed the main clutch pedal is released to engage the main clutch, and thereafter the frictionally engaged clutch sections locked to the driven shaft, so that, the drive is first through the frictionally engaged clutch sections and the rotation of the driving and driven shafts equalized, and thereafter the clutch section which is permanently secured to the driving shaft is locked to the driven shaft, so that the friction is not relied upon to transmit the motion between the driving and driven shafts.

In its entirety this transmission mechanism comprises driving, driven and intermediate shafts 1, 2 and 3, the intermediate shaft being the direct driver for the driven shaft, a counter shaft 4 supported in a suitable casing 5, change speed gearing between the driving shaft 1, the countershaft 4 and the intermediate shaft 3; a main clutch 6 for connecting and disconnecting the drive shaft from the engine of the vehicle and a secondary clutch 7 between the intermediate shaft 3 and the driven shaft 2 operating in conjunction with the main clutch. The driving, driven and intermediate shafts are preferably arranged in axial alinement in the ordinary transmission gearing of this type. The shaft 2 is the driven shaft connected directly to the propeller shaft through a universal joint.

In my transmission mechanism the driven shaft 2 is practically a section of the intermediate shaft 3 or what is the driven shaft in the ordinary transmission gearing. The driven shaft or shaft section 2 is connected to the propeller shaft in any well known manner, usually through a universal joint, as will be understood by those familiar with the art. The intermediate shaft 3 is journalled at its front end in a bearing in the inner end of the shaft 1 and at its rear end in a bearing 13 in the rear wall of the case 5.

The driven shaft or shaft section 2 is journalled at its front end at 14 in the rear end of the shaft 3 and at its rear end in a bearing 15 mounted in the rear end wall of the casing 16 for the secondary clutch which casing is detachably mounted on the rear end wall of the casing 5. The countershaft 4 is also journalled in suitable bearings in the end walls of the case 5 parallel to the intermediate shaft 3.

As the main clutch 6, may be of any suitable form, size and construction, description thereof is thought to be unnecessary. It is sufficient to bear in mind that such clutch includes an axially shiftable member operating a disk or disks this member being operated by a collar 32, Fig. 11, which collar is moved in one direction to engage the clutch by a powerful spring and in the other direction by a yoke 33 which is operated by a clutch pedal 34.

The secondary clutch comprises frictionally engaged clutch sections 35, 36, one of which as section 35 is secured to the intermediate shaft 3 or the driving shaft for the driven shaft 2, to rotate therewith, and the other of which as 36 is mounted on the shaft 2 to rotate about the same, the section 36 also having a portion enclosing the periphery of the shaft 2, and means operable when operated for successively locking the sections 36 and 35 to the shaft 2 when operated in one direction and successively unlocking the sections 36 and 35 from the shaft 2 in the reverse order, that is, first unlock the section 35 and then the section 36. The sections 35 and 36 are here shown as provided with conical friction surfaces at 37 and the section 35 is shown as formed integral with the shaft 3. The section 36 is spring pressed to constantly, yieldingly and frictionally engage the conical surfaces 37 and there is no operating means for shifting the sections 35, 36 apart. As here illustrated, the section 36 is constantly pressed toward the section 35 by a series of springs 38 located in suitable recesses 39 in the rear face of the section 36 and thrusting at like ends against the bottoms of the recesses and at their other ends against an abutment ring 38ª. The abutment ring thrusts against an annular plate 40 at the rear end of a cylindrical housing 41 enclosing the clutch sections 35 and 36 and interlocked with the clutch section 35, it being formed with an in-turned annular flange 42 at its front end abutting against the rear face of the section 35. The ring or plate 40 is interlocked to the rear end of the housing 41 by any suitable means and, as here illustrated, the housing 41 at its rear edge is formed with notches 43 and with in-turned lips 44, formed by an internal annular groove, the plate 40 being formed with tongues 45 fitting into the notches; and a split resilient locking ring 46 is sprung into the groove against the rear side of the plate 40 and behind the lips 44.

The means for locking the sections 35 and 36 to the shaft 2 comprises a key operating to lock the section 36 to the shaft and also a key operating to lock the section 35 to the shaft, the keys being normally arranged within the periphery of the shaft 2 and being shiftable to project portions thereof above said periphery into interlocking engagement with the walls of the bores of the sections 36 and 35. Preferably a pair of keys are employed to lock the section 36 to the shaft 2 and also another pair of keys to lock the section 35 to the shaft. One key of each pair serves to transmit motion in one direction and the other key of each pair to transmit motion or the torque in the other direction, the keys of each pair being reversely arranged. 50 and 51 designate keys for locking section 36 to the shaft 2, and 52 and 53 the pair of keys for locking the clutch section 35 to the shaft 2. These keys, as shown in Figs. 3 to 10 inclusive, are rounding or arc-shaped in cross section and fit in lengthwise arc-shaped grooves or channels 54 formed in the shaft 2 and are rockable about their axes in the channels to project portions as shoulders 55 and 56 on the keys 50 and 51 and shoulders 57 and 58 on the keys 52 and 53 respectively above the periphery of the shaft 2 into recesses 59 and 60 within the bores of the clutch sections 36 and 35.

Obviously, upon the rocking of these keys about their axes in one direction to project the shoulders 55 and 56 of the keys 50 and 51 above the periphery of the shaft 2, such shoulders will enter a diametrically opposite pair of notches 59 in the clutch section 36, so that rotation of the clutch section 36 to the right, Fig. 3, will be transmitted to the shaft 2, through the key 50 and rotation of the clutch section 36 to the left will be transmitted through the shoulder 56 of the key 51 to the shaft 2, also any driving force of the shaft 2 when the shaft 2 is being driven by the momentum of the vehicle will be transferred from the shaft 2 to the clutch section 36 through the shoulder 56 of the key 51.

Rotation in one direction of the clutch section 35 will be transferred directly to the shaft 2 through the shoulder 57 of the key 52 and rotation of such section 35 in the opposite direction will be transferred to the shaft 2 through the shoulder 58 of the key 53 and also any driving effect of the shaft 2, due to the momentum of the vehicle, will be transferred from the shaft 2 to the clutch section 35 through the shoulder 57 of the key 52.

The keys 50, 51 and 52, 53 are preferably of the same length, but for convenience the keys 50, 51, which serve to lock the clutch section 36 nearest the collar 61, to the shaft 2, are referred to as short keys as they need not be as long as the keys 52, 53 and their projecting portions or shoulders 55, 56 are located nearer the right hand ends of such keys than the shoulders 57, 58 of what for convenience are called the long keys 52, 53. That is, the keys 50 and 51 are short keys for the reason that their active portions or shoulders 55, 56 are located nearer one end, as the right hand end of the keys, than the active portions or shoulders 57, 58 of the keys, 52, 53.

The means for shifting the keys 50, 51 and 52, 53 about their axes in the channels 54 comprises a collar or sleeve 61 shiftable axially of the shaft 2 and of the keys into and out of engagement with oppositely inclined cam faces on each key on opposite sides of its longitudinal axis and on opposite sides of the collar 61. 62 and 63 designate the oppositely inclined cam faces on opposite sides of the axis of the short keys 50 and 51 which coact with the clutch section 36 and 64, 65 designate the oppositely inclined cam faces on the long keys which coact with the clutch section 35, these cam faces being so inclined and spaced apart lengthwise of the keys and being located on opposite sides of the longitudinal axes of the keys, that when the collar 61 is shifted in one direction as to the left, Fig. 1, it engages the inclined faces 62, 64 of the keys 50, 51 and 52, 53, and the keys will be rocked to project their high points or shoulders 55, 56 and 57, 58 beyond the periphery of the shaft 2, and when the collar is shifted in the other direction as to the right, Fig. 1, and engage the cam faces 63, 65, the keys will be rocked in the opposite direction to withdraw their high points 55, 56 and 57, 58 within the periphery of the shaft 2 and thus unlock the sections 36 and 35 from the shaft 2.

The cam faces 62, 64 of the short and long keys 50, 51 and 52, 53 and also the cam faces 63 and 65 of such keys are arranged out of transverse or circumferential alinement or alinement in a direction circumferentially of the shaft or, in other words, the cam faces 64 and 65 of the long keys are spaced apart the same distance apart as the cam faces 62, 63 of the short keys but the faces 62 of the short keys and the faces 65 of the long keys are arranged nearer the left and right ends of the collar 61 than the corresponding faces 64, of the long keys and faces 63 of the short keys, so that, the faces 62 of the short keys and 64 of the long keys are successively engaged by the collar 61 when shifted to the left, and the faces 65 of the long keys and 63 of the short keys are successively engaged by the collar when shifted to the right. Therefore, assuming that the clutch sections 35, 36 are locked to the shaft 2, upon shifting of the collar 61 to the right, Fig. 1, the collar will first engage the cam faces 65 of the long keys and rock said long keys to first disengage the clutch section 35 from the shaft 2 and will thereafter engage with the cam faces 63 of the short keys and disengage the clutch section 36 from the shaft 2, so that, during the interval following the disengagement of the section 35 from the shaft 2, the shaft 2 is frictionally driven. Likewise, to again lock the clutch sections 36 and 35 successively to the shaft 2, the collar 61 when shifted to the left first engages the cam faces 62 of the short keys 50 and 51 and rocks them to interlock with the clutch section 36, so that, the torque between the sections 35 and 36 is transmitted through the conical friction surfaces 37 giving the motion between the intermediate shaft 3 and driven shaft 2 time to equalize; and thereafter the collar 61 engages the cam faces 64 of the long keys 52, 53 and rocks them in their channels to interlock with the section 35. During the period that the torque is transmitted through the conical friction faces, the motions between the shafts 2 and 3 is synchronized before the shaft 3 is positively locked to the shaft 2 by operation of the long keys 52, 53. As the rotary motion of these shafts is substantially synchronized, there is no attendant shock or jar or noise.

Furthermore, owing to the rocking movement of the keys there is no pumping action nor any retarding of the operation thereof, due to a plunger effect of sliding keys in the channels which may be filled with oil.

The collar 61 is operated by a suitable fork 66 working in a groove 67 in the collar 61, this fork being mounted upon a rock shaft 68 journalled in the cover 69 of the case 16, this rock shaft having a lever arm 70 at its outer end which is connected by a link 71 to the clutch pedal lever 34.

The casing 16 is detachably mounted on the rear wall of the case 5 and, as here shown, is provided with a flange 72 secured to the rear wall of the casing 5 in any suitable manner as by cap screws 73. Thus the secondary casing with its housing can be attached and removed as a unit to and from the gear casing 5.

In operation, when the clutch pedal 34 is depressed, the rock shaft 68 is also actuated to shift the collar 61 to the right and thus first operate the keys 52, 53 to release the clutch section 35 from the shaft 2 and thereafter to operate the keys 50, 51 and release the clutch section 36, so that the intermediate shaft 3 and countershaft 4 and also the driving shaft is disconnected from all forces tending to turn them and hence the shifting of the gears of the change speed gearing takes place either when the gears are rotating very slowly and without any power driving them or when they are idle. After the gears have been shifted and the clutch pedal lever 34 is released to allow the clutch spring to engage the main clutch, the rock shaft 68 is also operated to shift the collar 61 to the left, first operating the short keys 50, 51 to lock the clutch section 36 to the shaft 2, so that either the shaft 3 drives the shaft 2 through the frictionally engaged sections 35, 36 and, if their rotation is not the same, permits their rotation to synchronize, or if the shaft 2 is acting as a driver, due to the momentum of the vehicle, also permits the rotation of the shafts to equalize through the frictionally engaged sections 35, 36. When the synchronization is effected, the collar 61 acts to engage the cam surfaces 64 of the long keys and operates the long keys 52, 53 to positively connect the clutch section 35 to the shaft 2, the interval between the operation of the short and long keys 50, 51 and 52, 53 being sufficient to give the frictionally engaged clutch sections 35, 36 time to synchronize the rotation of the shafts, 2, 3.

By reason of the constantly and yieldingly frictionally engaged clutch sections 35, 36 being entirely disconnected from the driven shaft 2 during the gear shifting operation and also by reason of the friction between the sections 35, 36 being constant and predetermined, and not dependent in the least on the skill of the operator and further owing to the successive interlocking of the sections 35, 36 with the shaft 2, so that an interval is provided for a slipping and synchronizing of the sections through constant predetermined frictionally engaged sections, the transmission gearing can be connected to the propeller shaft of the vehicle without shock or jar following the gear shifting operation or following any time when the main clutch is thrown off and again let in without shifting the gears, as for instance, when the vehicle is coasting down a hill or on a level with any one of the shiftable gears in its engaged positions and with the main clutch thrown out, and letting in the main clutch at the approach of the foot of the hill. Ordinarily, under such conditions the propeller shaft is rotating faster than the engine, and when the clutch is let in there is a violent jar due to the propeller shaft giving sudden impulse to the engine through the gearing. Such jars throw sudden strains on the gearing and on the splines and keys of the rear axle shafts, and tend to break them or develop looseness therein.

By my transmission mechanism, such violent shocks and attendant evils are eliminated.

What I claim is:

1. In a transmission mechanism, the combination of driving and driven shafts, frictionally engaged clutch sections, one of which is rotatably secured to one of said shafts and encloses the other shaft, and the other of which sections is rotatably mounted on the other shaft and means interposed between the latter shaft and the sections and extending into the bores thereof, and operable when actuated to successively lock the frictionally engaged sections to the latter shaft and successively unlock them in reverse order.

2. In a transmission mechanism, the combination of driving and driven members, a pair of frictionally engaged clutch sections, one clutch section being secured to one member to rotate therewith, and enclosing a portion of the other member, and the other section also surrounding a portion of the latter member, and rotatably mounted thereon, and mean operable to successively lock said clutch sections to the latter member.

3. The combination of driving and driven shafts, arranged in axial alinement, frictionally engaged clutch sections, one section being secured to one of said shafts to rotate therewith, and the other section being rotatably mounted surrounding the other shaft, and shiftable means operable to connect both of said sections to such latter shaft.

4. The combination of driving and driven shafts, arranged in axial alinement, frictionally engaged clutch sections, one section being secured to one of said shafts to rotate therewith, and the other section being rotatably mounted on the other shaft, and shiftable means operable to successively connect the sections directly to such other shaft.

5. In a transmission mechanism, driving and driven shafts arranged in axial alinement, frictionally engaged clutch sections, one section being secured to the driving shaft to rotate therewith, and having a portion enclosing the driven shaft, and the other section being rotatably mounted on the driven shaft adjacent the former section, and shiftable means operable to lock the sections directly to the driven shaft.

6. In a transmission mechanism, the combination of driving and driven members, frictionally engaged clutch sections having portions enclosing one of said members and one section being rotatably mounted on one of said members and the other section being connected to the other of said members to rotate therewith, and shiftable means operable to successively lock the frictionally engaged sections to the former member, and successively unlock such sections from the former member in the reverse order whereby the motion is first transferred through the frictionally engaged sections from either member to the other and thereafter transmitted directly from one member to the other.

7. In a transmission mechanism, the combination of driving and driven members, a clutch section secured to one member to rotate therewith, and having a portion enclosing the other member, a second clutch section rotatably mounted on the latter member, and normally rotatable relatively thereto, the clutch sections being frictionally engaged, and shiftable means operable when shifted in one direction to connect the second section to such latter member, and thereafter connect the first section to the latter member, and when operated in another direction to first disconnect the first section and thereafter disconnect the second section from such latter member.

8. In a transmission mechanism, the combination of driving and driven members, a clutch section, secured to one member to rotate therewith, and having a portion enclosing the periphery of the other member, a second clutch section mounted on such other member to rotate relatively thereto, the clutch sections being frictionally engaged, and means normally arranged within the periphery of the latter member and operable when operated to project beyond the periphery thereof to lock both sections to such member.

9. In a transmission mechanism, the combination of driving and driven members, a clutch section, secured to one member to rotate therewith, and having a portion enclosing the periphery of the other member, a second clutch section mounted on such latter member to rotate relatively thereto, the clutch sections being frictionally engaged, and means normally arranged within the periphery of the latter member and operable when operated to project beyond such periphery to lock both sections to the latter member, such operating means when operated in one direction acting first to connect the second clutch section to such latter member and thereafter connect the first clutch section to such latter member and when operated in another direction to disconnect such sections from such latter member in the reverse order.

10. In a transmission mechanism, driving and driven shafts, arranged in axial alinement, a clutch section mounted on one shaft to rotate therewith, and enclosing the periphery of a portion of the other shaft, a second clutch section mounted on the latter shaft, and rotatable relatively thereto, the latter shaft being formed with lengthwise grooves, and the clutch sections provided with recesses in the bores thereof, the grooves being arc shaped and arc shaped keys lying in the grooves normally below the periphery of the latter shaft, and means for rocking the keys to project portions thereof above the periphery and into such recesses.

11. In a transmission gearing, the combination of a shaft, a pair of frictionally engaged clutch sections mounted on the shaft to rotate relatively thereto, the shaft being formed with two pairs of lengthwise grooves arc-shaped in cross section, and the clutch sections being formed with recesses in the bores thereof, keys arc-shaped in cross section arranged in the pairs of grooves, and being mounted to rock therein, said keys being normally disposed below the periphery of the shaft and being movable to project portions thereof above the periphery of the shaft, the projections of one pair of keys being arranged to interlock with the recesses of one clutch section, and the projections of the other pair of keys to interlock within the recesses of the other clutch section, the keys of each pair being reversely arranged relatively to each other one being right hand to transmit motion in one direction and the other being left hand to transmit motion in the reverse direction, each key being provided with reversely arranged cam faces spaced apart in the direction lengthwise of the key and located on opposite sides of the axis of the key, a sleeve slidable on the shaft and on the keys between such cam faces, the cam faces of one pair of keys being arranged out of circumferential alinement with the cam faces of the other pair of keys, whereby such pairs of keys are successively rocked in the grooves.

In testimony whereof, I have hereunto signed my name, at Syracuse, in the county of Onondaga, and State of New York, this 20th day of November, 1923.

GEORGE C. CARHART.